G. C. BEIDLER.
PHOTOGRAPHING AND DEVELOPING APPARATUS.
APPLICATION FILED MAY 20, 1911.
1,171,496.  Patented Feb. 15, 1916.
3 SHEETS—SHEET 1.
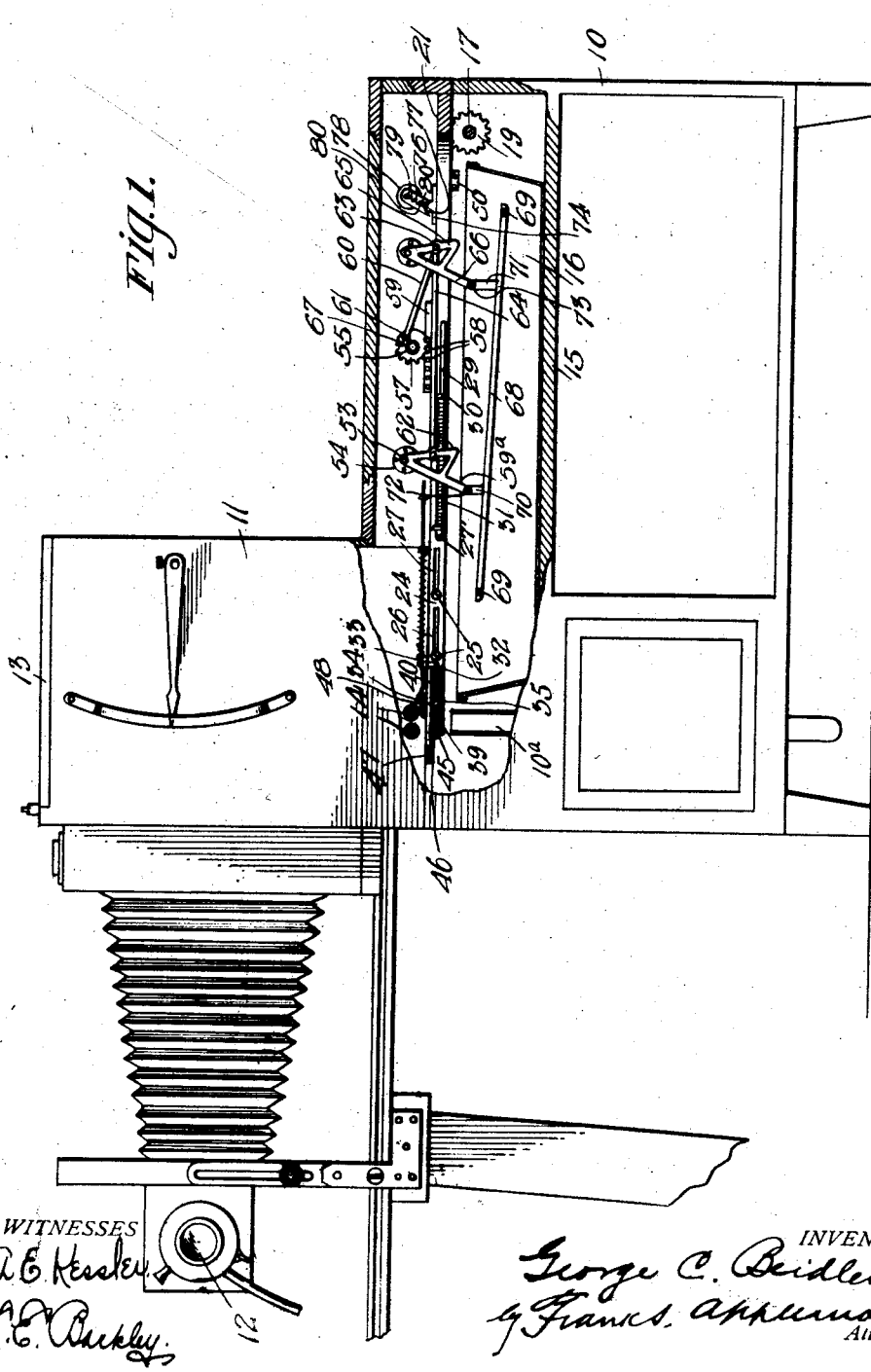

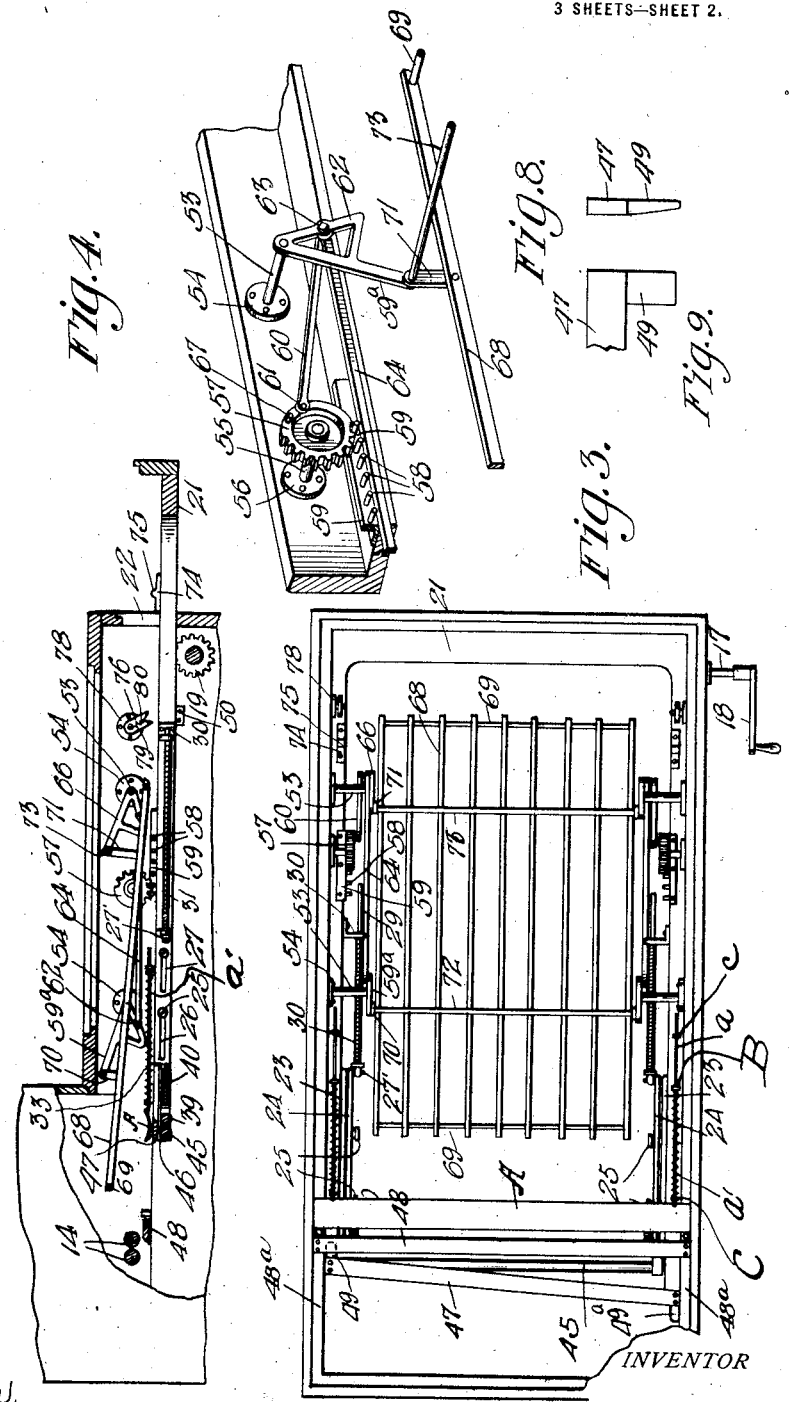

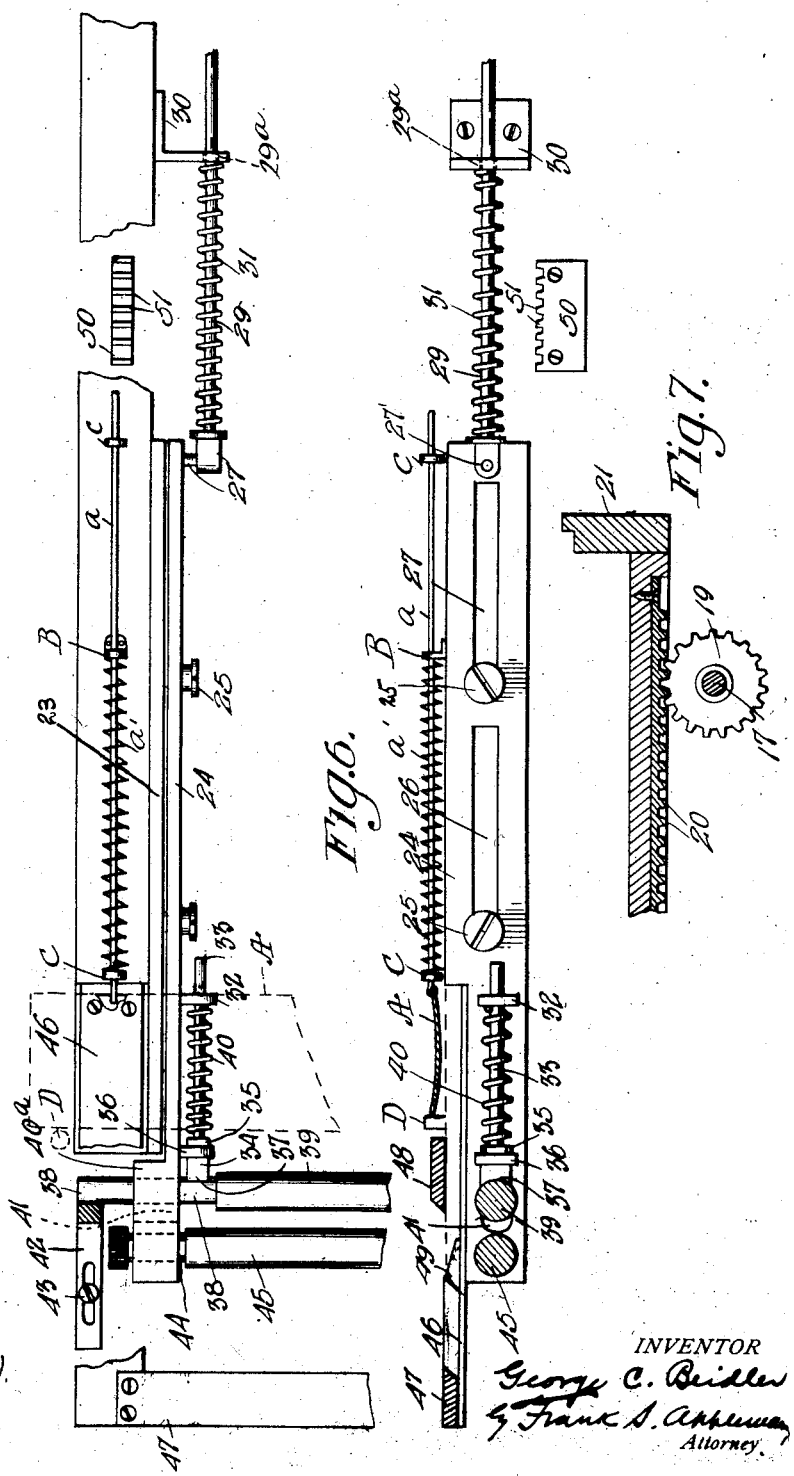

UNITED STATES PATENT OFFICE.

GEORGE C. BEIDLER, OF ROCHESTER, NEW YORK.

PHOTOGRAPHING AND DEVELOPING APPARATUS.

1,171,496. Specification of Letters Patent. Patented Feb. 15, 1916.

Application filed May 20, 1911. Serial No. 628,414.

*To all whom it may concern:*

Be it known that I, GEORGE C. BEIDLER, a citizen of the United States of America, and resident of Rochester, in the county of Monroe and State of New York, have invented certain new and useful Improvements in Photographing and Developing Apparatus, of which the following is a specification.

This invention relates to photographing and developing apparatus and relates more particularly to a machine adapted to expose sensitized material to the action of light and to thereafter sever the exposed section of the film and subject the said film to the action of fluid designed to act on the coated surface of the film.

An object of this invention is to provide means for holding and conveying the film and for severing the said film from the portion thereof contained within the exposing chamber, novel means being also provided for successively carrying the said film into a receptacle containing the fluid and for submerging the said film in the fluid.

Furthermore, an object of this invention is to provide novel means associated with the film carrying means for moving the said film carrying means to dislodge the film therefrom and permit it to be deposited in the said receptacle.

Furthermore, an object of this invention is to provide a member adapted to be moved in the casing and to provide novel means whereby the movement of the member results in the actuation of the film carrying means and the film immersing means and wherein further movement of the said member results in movement of the film carrying means and the film immersing means in a direction opposite to that first mentioned.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation, partly in section of a photographing and developing apparatus embodying the invention; Fig. 2 illustrates a detail sectional view of the film carrying and submerging apparatus; Fig. 3 illustrates a top plan view of the said parts; Fig. 4 illustrates an enlarged detail perspective view of the operating mechanism for the film submerging device; Fig. 5 illustrates a detail plan view of a fragment of the film carrying device; Fig. 6 illustrates a side elevation of the same, partly in section; Fig. 7 illustrates a detail sectional view showing the rack and pinion for moving the frame; and Figs. 8 and 9 illustrate an end view and a plan view of the knife, respectively.

In these drawings I have shown a casing or box or inclosing device which may be constructed in any appropriate manner but here shown as comprising a rectangular inclosure 10 having an auxiliary inclosure 11 extending upwardly therefrom, the latter inclosure being designed as a combined magazine for containing a supply of sensitized material and an exposing chamber, whereby light admitted by the camera 12 reaches the sensitized material and the sensitized material is acted on by the light, 13 being a door or closure through which the film is supplied to the magazine. The exposing chamber, magazine and camera are of the general type shown in my reissued Patent Number 12,834, dated July 28, 1908, and will not, therefore be described in detail, it being understood that film is drawn through the exposing chamber and projected between the rollers of a carrying device (to be presently explained) by means of the feed rollers 14, the rotation of which draws film from the magazine through the exposing chamber and forces it between the said rollers of the carrying mechanism. The camera and exposing chamber may, therefore, be regarded as exposing film to light.

The rectangular casing 10, is here shown as having a receptacle 10ᵃ to which film is delivered by the rollers of the carrying mechanism and the said casing 10 is further shown as having a partition 15 supporting a receptacle 16 which is intended to contain liquid which will act on the coated surface of the film preferably developing solution. The rectangular casing 10 is provided at a point above the partition 15 with a transversely disposed shaft 17 journaled in the sides of the inclosure in any suitable way and provided externally of the casing with a crank handle 18 by which the shaft may be rotated. Within the inclosure, the shaft 17 has gear wheels 19 which engage the teeth 20 of a rack located on the under surface of a frame 21 which is slidable in the inclosure and movable through an aperture 22 formed in the end wall of the said inclosure.

Each side of the frame has on its inner surface members which are duplicated and, for convenience in describing, the parts on one side of the frame will be referred to and it is understood that the parts on the opposite side are of similar construction and in like relation to the coacting elements.

A wear plate 23 is secured to the inner surface of the side of the frame and a sliding plate 24 is mounted on the studs 25 which extend through the plate 23 and which are lodged in the side of the frame, the said sliding plate having slots 26 and 27 which permit movement of the said plates relative to the studs. The plate 24 at one end is provided with a pivot 27' to which the rod 29 is attached the said rod extending through an aperture in the bracket 30 which bracket is connected to the side of the frame. The rod 29 is encircled between the end of the sliding plate 24 and the bracket 30 by a spring 31, which spring holds the sliding plate pressed inwardly beyond the end of the frame. The sliding plate is further provided with a lug 32 apertured to receive the rod 33 which is slidable therein, the said rod 33 having a head 34 forming a shoulder 35. The head 34 is slidable in a guide 36 on the plate 24 and the head 34 is concaved to form a bearing 37 for the spindle 38 of the roller 39. A spring 40 encircles the rod 33 between the lug 32 and the shoulder 35 and presses the roller longitudinally of the bearing $40^a$, which bearing is formed on the inner end of the plate 24. The bearing $40^a$ has a slot 41 therein, in which the spindle 38 is journaled and the said spindle is, therefore, movable in the slot under the influence of the spring 40 or under the influence of the stop 42 which is secured to the inner surface of the inclosure by means of the screw 43, the said stop being adjustable for the purpose of effecting the arrest of the spindle of the roller 39 at the proper position of the same with relation to other parts of the mechanism to be presently explained.

The bearing $40^a$ has provision for rotatably supporting the spindle 44 of the roller 45 which roller 45 is designed to coact with the roller 39, but the spindle has no movement with relation to the bearing $40^a$, other than that of a rotary movement, whereas the spindle 38 is slidable longitudinally of the bearing $40^a$ as stated. The inner end of the side of the frame has a spring arm 46, the said spring arm carrying a knife blade 47 designed to coact with the stationary blade 48 which stationary blade is normally above the rollers 39 and 45 when the said rollers are in their innermost position of adjustment. The stationary plate is supported by flanges $48^a$ projecting inwardly from the sides of the casing. Due to the fact that the arms 46 are resilient, the movement of the blade 47 with relation to the blade 48 and due also to the action of the guide 49 carried by the blade 47 and adapted to ride under the blade 48 and bring the blades into operative relation, a draw cut is effected between the two blades whereby the film is severed by a positive operation unfailing because of the relation of parts by which the knives are forced into intimate contact. The blade 47 is also provided with a guide $49^a$, which depresses the blade 47 so that it will ride under the blade 48 on an inward movement of the frame, so that the guide $49^a$ operates to guide the knife 47 to the knife 48 on the outward movement of the frame and the function of the guide $49^a$ is to operate the blade 47 on a reverse movement of the said frame.

The spring 40 is of greater rigidity than the spring 31 and is made stronger for the purpose of preventing movement of the spindle 38 upon outward movement of the frame until such time as the rollers come in contact. The operation of the parts of the cutting and carrying apparatus just described results from a movement of the frame and is as follows, viz: When the frame is drawn outwardly, the studs 25 move in the slots 26 and 27 of the sliding plate and the bracket 30 being moved with the frame diminishes the pressure on the spring 31, thus permitting the spring 40 to force the sliding plate 24 rearwardly while holding the spindle 38 of the roller against the stop 42. While the sliding plate 24 is moving in the manner just stated, the bearing $40^a$ which has a slot therein for the spindle 38 is free to move independently of the spindle 38 until the periphery of the roller 45 contacts with the periphery of the roller 39 or a film that is interposed between the rollers 39 and 45. Upon the bringing together of the rollers 45 and 39, the film which has been projected between the said rollers is clamped and held while the frame is further moved outwardly by the operator. Such further movement is afforded by reason of the slots 26 and 27 in the sliding plate so that there is no movement of the sliding plate under the influence of the frame until the said frame has moved a distance equal to the length of the slots 26 and 27. Meanwhile the knife 47 is carried into engagement with the knife 48 and is effective to cut the film so that the part projected from the exposing chamber is cut from the web remaining in the exposing chamber and is held between the rollers 45 and 39. At the time the film is cut, the studs 25 have reached the end walls of the slots 26 and 27 and motion is then communicated to the sliding plate which in turn carries the rollers 45 and 39 having gripped therebetween the film which is carried over the receptacle 16 containing the fluid.

At a point near the outer end of the enclosure 1 station a rack plate 50, the teeth 51 of which are in the path of travel of the toothed wheel 52 which toothed wheel is on the spindle 44. On engagement of the teeth of the plate and the teeth of the wheel 52, the roller 45 is partially rotated and such rotation results in a dislodgment of the film from between the rollers 45 and 39, permitting the said film to fall into the receptacle, after which the frame may be moved rearwardly for a repetition of the operation. It will be obvious from an inspection of the drawing, that upon the inward movement of the said frame, the spindle 38 is arrested by the stop 42 and that the stud 25 engaging the inner end walls of the sliding plate forces the said sliding plate inwardly until the spindle 38 engages the outer end wall of the slotted bearing thus separating the rollers 45 and 39 in order that film may be admitted between them, and the operation is then repeated.

The means for immersing the film in the receptacle 16 is operated through the movement of the frame and as the parts of the mechanism for operating the immersing member are duplicated on each side of the inclosure, the description will be continued as referring to one side of the inclosure and it is to be understood that the said parts are preferably duplicated on the opposite side thereof in order to render the operation positive and satisfactory. Located at a point toward each end of the receptacle 16 is a stud 53 each of which studs projects from a plate 54 attached to the inner surface of the casing and at a point between the studs 53 is a shaft 55 which likewise projects from a plate 56 attached to the inner surface of the casing and on the said shaft is mounted a mutilated gear wheel 57 which is engaged by the teeth 58 of the rack 59. The rack is secured to the side of the frame and is carried by said frame in its movement longitudinally of the inclosure. An arm 59ª is mounted on each stud 53 and is free to oscillate under the influence of a pitman 60 which is connected to a pin 61 on the gear wheel 57 and to an angular extension 62 of the arm 59ª. The pitman 60 is mounted on a pin 63 and a link 64 is also connected to the said pin 63 and extends to the angular portion 62 of the arm 59ª which is mounted on the other stud 53 on the same side of the casing. The gear wheel 59 has a stop lug 67 projecting from its side which is contacted by the pitman 60 to limit the degree of rotation of the said gear wheel and to lock the pitman against movement so that the print immersing frame (to be hereinafter described) will be held in its elevated position until the rack actuates the gear wheel in an opposite direction. The stop lug is in such position on the gear wheel as to permit the pin 61 to travel below the horizontal plane of the stud 55 or past the center and it is held in that position by the stop lug until the gear wheel is moved in an opposite direction by the rack on the frame. It is desirable in view of the function to be performed that the rack 59 shall be a predetermined length and shall disengage the teeth of the gear wheel when the proper movement has been accorded the gear wheel, and that the frame shall be free to move a predetermined distance without affecting or communicating motion to the said gear wheel.

The immersing frame preferably comprises a series of parallel bars 68 with apertures therein to receive the transversely disposed rod 69 by which a grid-like frame is formed and the outer bars 68 are preferably provided with posts near the ends thereof, the said posts being numbered 70 and 71. The posts in turn are provided with apertures for the reception of the transversely disposed hanger rods 72 and 73 which are connected to the arms 59ª so that the immersing frame is suspended from and carried by the said arms and is moved by the said arms to the position shown in Fig. 2 which is its extreme elevation or to the position shown in Fig. 1 which is its lowermost position. Fig. 1 shows that the post 70 is slightly shorter than the post 71 and the difference in the lengths of these members provides for the frame being suspended in a slightly inclined position so that in its downward swinging movement the frame will carry the film downwardly and longitudinally of the frame. It has been found in practice that such movement of the frame is desirable as any air which has collected under the film is expelled and the liquid is permitted to reach the coated surface of the said film.

Each side of the frame is provided with a plate 74 with a lug 75 thereon which is engaged by a depending arm 76 having a recess 77 in its end. The arm is hinged on the plate 78 secured to the inner surface of the casing and the said arm has a spring 79 connected to it near its outer end, the said spring being anchored to the casing as at 80. As the frame is moved in the casing, the lug 75 enters the recess 77 in the end of the arm and said arm is thereby oscillated from side to side as the frame is reciprocated, and the arm serves to hold the frame within the casing against the action of the spring carried by the frame until said frame is properly manipulated.

From what has been stated, reference to the drawing will, it is believed, disclose the operation of the immersing mechanism for it will be seen that as the frame is moved in the casing in one direction, the immersing frame will be elevated to the position shown in Fig. 2 under the influence of the rack 59 which rotates the gear wheel 57 and swings the arms to their elevated positions, whereas a reverse movement of the frame results in partially rotating the gear wheel in an opposite direction and moving the arms to an approximately vertical position when the immersing frame will extend into the receptacle 16.

The operation of the apparatus has been described in connection with the description of the elements and their functions, but briefly repeated, it will be seen that when film is drawn from the exposing chamber, it is projected or fed into the receptacle 10$^a$ which may, preferably, contain developing fluid and that, with the movement of the frame longitudinally of the casing, the film is drawn from the receptacle 10$^a$ and is carried to the receptacle 16 where it is disengaged from the rollers of the carrier, due to the partial rotation of said rollers and that the said film is then immersed in the receptacle 16 by the immersing frame.

The frame is provided on its upper edge with a shield A which is trough-like and is provided for the purpose of catching drippings from the immersing member when it is carried to its elevated position and the frame is moved thereunder. The shield is connected to a rod $a$ slidable in a bracket B on the sliding frame, said rod having collars C and $c$ secured thereon. A spring $a'$ encircles the rod $a$ between the bracket B and the collar C and the frame or casing has a stop pin D, contacted by the shield when the frame is moved inwardly. The parts just described are duplicated on the opposite side of the frame and the operation is as follows: When the frame is moved inwardly, the shield striking the pins D is arrested, and the springs $a'$ are compressed until the frame reaches the limit of its inward movement in which position the rollers 39 and 45 have been carried beyond the shield and the knife 47 has been permitted to pass beyond the rollers. Upon outward movement of the frame, the knife 47 is caused to travel to engage the knife 48 above the rollers 39 and 45 and thereafter motion is communicated simultaneously to the rollers and knife 47 while the shield A is being held stationary by the springs $a'$ so that at the time the shield starts to move, the knife and rollers are under the shield and in position to be protected against the drippings from the immersing frame.

I claim—

1. In an apparatus relating to photography having means for containing film, means for drawing film from the means for containing film, rollers between which the film is delivered from the means for drawing film, a reciprocating frame, a bearing in which one of the rollers is rotatable and in which a companion roller is rotatable and slidable, whereby the relation of one roller to the other may be changed, a receptacle with relation to which the frame is movable and with relation to which the film carried by the rollers is moved, means for rotating one of the rollers as the frame is moved for dislodging the film from the rollers and delivering it in the receptacle, and means for separating the rollers after dislodgment of the film from the said rollers.

2. In an apparatus relating to photography having means for containing film, means for drawing film from the means for containing film, rollers between which the film is delivered from the means for drawing film, a frame having journal bearings for the rollers, one of said journal bearings being slotted to permit movement of one roller with relation to the other roller, whereby the said rollers are permitted to assume operative and inoperative positions with relation to each other, means for rotating one of the rollers when the rollers are in operative relation to each other, and means for effecting movement of one of the rollers with relation to the other roller.

3. In an apparatus relating to photography having means for containing film, means for drawing film from the means for containing film, rollers between which the film is delivered from the means for drawing film, a frame, journal bearings carried by the frame in which the rollers are rotatable, the journal bearings being slotted to permit sliding movement of one roller with relation to the other roller, means for holding the rollers in operative relation to each other, means for rotating one of the rollers when the rollers are in operative relation to each other, and means for moving one of the rollers out of operative relation to the other roller.

4. In an apparatus relating to photography having means for containing film, means for drawing film from the means for containing film, rollers between which the film is delivered from the means for drawing film, a frame, journal bearings carried by the frame in which the rollers are rotatable, the journal bearings being slotted to permit sliding movement of one of the rollers with relation to the other roller, means for holding the rollers in operative relation to each other, means for rotating one of the rollers when the rollers are in operative relation to each other for dislodging film therefrom, a receptacle to receive the dislodged film, an immersing member, and means for moving the immersing member into the receptacle to press the film into the receptacle.

5. In an apparatus relating to photography having means for containing film, means for drawing film from the means for containing film, carrying members to which the film is delivered, means for cutting the film delivered to the carrying member, a receptacle to which the film is delivered by the carrying members, an immersing member operatively mounted with relation to the receptacle, arms from which the immersing member is suspended, and means for oscillating the arms.

6. In an apparatus relating to photography having means for containing film, means for drawing film from the means for containing film, carrying members to which film is delivered by the drawing means, a sliding frame on which the carrying members are mounted, a receptacle to which film is delivered by the carrying members, an immersing member, arms on which the immersing member is mounted, and means actuated by the movement of the sliding frame for oscillating the arms and moving the immersing member with relation to the receptacle.

7. In an apparatus relating to photography, a receptacle adapted to contain fluid for acting on a film, a sliding frame, members for holding the film while said film-holding means is moved with relation to the receptacle, an immersing member mounted in operative relation to the receptacle, and means actuated by the movement of the frame for operating the immersing member.

8. In an apparatus relating to photography, a receptacle adapted to contain fluid for acting on a film, a sliding frame, members for holding the film while said film-holding means is moved with relation to the receptacle, an immersing member, pivotally mounted arms to which the immersing member is connected, means for oscillating the arms, and means connected with the frame for actuating the arm-oscillating means.

9. In an apparatus relating to photography, a receptacle adapted to contain fluid for acting on a film, a sliding frame, members carried by the frame for holding the film while said film-holding means is moved with relation to the receptacle, an immersing member, pivotally mounted arms arranged at opposite sides of the frame, means for connecting the arms on each side of the frame to move together, and means actuated by the movement of the frame connected to one of the arms on each side of the frame for oscillating said arms.

10. In an apparatus relating to photography, a casing, a receptacle therein, a film-carrying device, a frame on which the film carrying device is mounted, the said frame being movable with relation to the receptacle, arms pivotally mounted above the receptacle, an immersing member supported by the arms, means for raising and lowering the said arms, means associated with the means for raising and lowering said arms for holding the said arms in the raised position, and means connected with the frame for actuating the arm raising and lowering means as the frame is moving.

11. In an apparatus relating to photography, a casing containing a receptacle, a frame slidable in the casing above the receptacle, a sliding plate on each side of the frame, each of said plates terminating in a journal for bearings, rollers journaled in said bearings, said bearings having slots for one of the rollers whereby one of the rollers may move with relation to the other roller, means for holding one of the rollers in position in contact with the other roller, means for displacing one roller from coactive relation with the other roller, and means operative with the sliding of the frame for rotating one of the rollers when the rollers are in coactive relation.

12. In an apparatus relating to photography having a casing, a frame movable in the casing, plates movable independently of the frame and connected to the frame to be moved thereby, said plates having journal bearings, rollers journaled in the bearings, said journal bearings having slots in which one of the rollers is movable, means for moving the roller in the slots into operative relation with the companion roller when the frame is moved in one direction, and means for engaging the roller when the frame is moved in an opposite direction for forcing the companion roller away from its coacting roller against the action of the means for forcing the roller into coaction with the companion roller.

13. In an apparatus relating to photography, a casing for containing film, a receptacle therein for containing liquid to act on the film, a frame movable in the casing, a stationary cutting member with relation to which the film is movable, a cutting member carried by the frame to coact with the stationary cutting member, a film carrier on the frame operative to support the film while the cutting members are acting to sever the film, means for delivering film to the film carrier, means for disengaging the film from the carrier operative by the movement of the frame, and means operative by the movement of the frame for immersing film in the liquid.

14. In an apparatus relating to photography, a casing, a receptacle therein for containing liquid to act on a film, a frame movable in the casing, a stationary cutting member, a cutting member carried by the frame to coact with the stationary cutting member, a film carrier on the frame held stationary during the initial movement of the cutting member on the frame, and provided with means for receiving motion from the frame when the cutting member on the frame has coacted with the stationary cutting member to sever the film, means for disengaging film from the carrier, arms mounted to oscillate, an immersing member suspended from the arms and taking motion therefrom, means operated by the frame for oscillating the arms, and means for limiting the movement of the arms in one direction.

15 In an apparatus relating to photography having a casing, a frame movable in the casing, plates having slots, means on the frame projecting into the slots for slidably mounting the plates on the frame, journal bearings on the plates, rollers journaled in the bearings and having spindles projecting beyond said bearings, said journal bearings having slots for one of the rollers, means for rotating one of the rollers, means for pressing the roller in the slots into coactive relation with the other roller, means for arresting the roller in the elongated bearing for separating the rollers when the frame is moved in one direction, means for pressing the plates longitudinally of the frame and imparting movement to said plates independently of the movement of the frame, and a receptacle in the casing to which film is carried by the rollers and into which it is delivered by the rotation of one of the rollers.

16. In an apparatus relating to photography having a casing, a frame movable in the casing, plates having slots, studs in the slots of the plates extending into the frame for reciprocatingly mounting the plates on the frame, a spring for holding each plate normally projected with relation to the frame, rollers having spindles journaled in the bearings, said bearings having slots for one of the rollers, the said spindles projecting beyond the sides of the bearings, means for pressing one roller into coactive relation with the other roller when the frame is moved in one direction, means engaging the spindle of the roller pressed into coaction with the other roller for displacing the said roller from coactive relation with the companion roller, a pinion on the spindle of one of the rollers, means engaging the pinion for rotating the same, a stationary knife member, and a knife member carried by the frame coacting with the first named knife member for cutting film.

17. In an apparatus relating to photography having a casing, a frame movable in the casing, plates having slots, studs in the slots of the plates extending into the frame for reciprocatingly mounting the plates on the frame, a spring for holding each plate normally projected with relation to the frame, bearings in the plates, rollers having spindles journaled in the bearings, said bearings having slots in which one of the spindles of the rollers is rotatable and slidable, the said spindles projecting beyond the sides of the bearings, means for pressing one roller into coactive relation with the other roller when the frame is moved in one direction, means engaging the spindle of the roller pressed into coaction with the other roller, for displacing said roller from coactive relation with the companion roller, a pinion on the spindle of one of the rollers, means engaging the pinion for rotating the same, a stationary knife member, a knife member carried by the frame and coacting with the first named knife member for cutting film, and a latch for holding the frame at its limit of movement in one direction.

18. In an apparatus relating to photography, having a casing, a frame movable in the casing, plates having slots, studs in the slots of the plates extending into the frame for reciprocatingly mounting the plates on the frame, a spring for holding each plate normally projected with relation to the frame, bearings in the plates, rollers having spindles journaled in the bearings, said bearings having slots in which one of the spindles of the rollers is rotatable and slidable, means for pressing one roller into coactive relation with the other roller when the frame is moved in one direction, means engaging the spindle of the roller pressed into coaction with the other roller for displacing said roller from coactive relation with the companion roller, a pinion on the spindle of one of the rollers, means engaging the pinion for rotating the same, a stationary knife member, a knife member carried by the frame and coacting with the first named knife member for cutting film, and a guide for the second named knife member whereby the said knife member is forced into operative relation with the stationary knife member.

19. In an apparatus relating to photography, having a casing including a container for film, means for drawing film from the container, a receptacle for containing liquid adapted to act on the film, said receptacle being in position to receive film drawn from said container, a frame movable in the casing, plates on the frame, said plates having bearings, rollers journaled in the bearings, said bearings being slotted to permit movement of one of the rollers with relation to the other, means for pressing the rollers into coöperative relation to each other for engaging film delivered from said container, means operative independently of the rollers for severing the film, means for rotating one of the rollers to dislodge the film from between the rollers, a receptacle for containing liquid into which the film is delivered by the rotation of the roller, and means for immersing the film.

20. In an apparatus relating to photography having a casing including a container for film, means for drawing film from the container, a receptacle for containing liquid adapted to act on the film, said receptacle being in position to receive film drawn from said container, a frame movable in the casing, plates on the frame, said plates having bearings therein, rollers journaled in the bearings, said bearings having slots to permit movement of one of the rollers with relation to the other, means for pressing the rollers into coöperative relation to each other for engaging film delivered from said container, means operative independently of the rollers for severing the film, means for rotating one of the rollers to dislodge the film from between the rollers, a receptacle for containing liquid into which the film is delivered by the rotation of the rollers, racks carried by the frame, toothed wheels engaged by the racks, means for mounting the toothed wheels in the casing, pitmans connected to the toothed wheels, arms to which the pitmans are connected, an immersing member supported by the arms, and means on the toothed wheels engaging the pitmans for limiting the degree of rotation of the wheels and for supporting the pitmans in an elevated position.

21. In an apparatus relating to photography having a casing including a container for film, means for drawing film from the container, a receptacle for containing liquid adapted to act on the film, a frame movable in the casing, plates on the frame, journal bearings on the plates, rollers journaled in the said bearings, said bearings being slotted to permit movement of one of the rollers with relation to the other, means for pressing the rollers into coöperative relation to each other for engaging film delivered from the exposing chamber, means for moving the frame to draw film from the container, means operative independently of the rollers for severing the film, means for rotating one of the rollers, a shield for preventing the access of liquid to the knife and rollers, a receptacle for containing liquid into which the film is delivered by the rotation of the roller, and means for immersing the film.

22. In an apparatus relating to photography having a container for a supply of film, means for drawing the film from the container, a frame having gripping rollers to which the film is delivered from said container, means for moving the rollers, a cutting blade, means for moving the cutting blade with relation to the rollers, a shield with relation to which the blade and rollers are moved, an immersing frame, a liquid receptacle with relation to which the rollers are movable, an immersing member mounted to swing in the path of travel of the rollers, and means for swinging the frame above the rollers and knife while the rollers and knife and the shield thereon move under the frame.

23. In an apparatus relating to photography having a container for a supply of film, means for drawing film from the container, a reciprocating frame, gripping rollers carried by the frame to which the film is delivered from said container, means for moving the rollers into and out of operative relation to each other, and means for rotating one of the rollers while the frame is reciprocating.

24. In an apparatus relating to photography having means for containing film and having means for drawing film from the means for containing film, rollers between which the film is delivered from the means for drawing film, means for carrying the rollers, means for rotating one of the rollers while being carried, means for changing the relation of the rollers to each other, a receptacle with relation to which the rollers are carried and to which film is delivered during the rotation of one of said rollers.

25. In an apparatus relating to photography having means for containing film, and having means for drawing film from the means for containing film, rollers between which the film is delivered from the means for drawing film, means for rotatably supporting and carrying the roller including means for permitting movement of one roller toward and away from the other roller, and means for rotating one of the rollers while the same is being carried.

26. In an apparatus relating to photography having means for containing film, means for drawing film from the means for containing film, rollers between which the film is delivered from the means for drawing film, journal bearings for the rollers in which one of the rollers is rotatable and in which the other roller is rotatable and slidable, means for moving the slidable roller away from the companion roller, means for moving the slidable roller toward said companion roller, means for rotating one of the rollers to dislodge film therefrom, and a receptacle adapted to receive the film dislodged from the roller.

27. In an apparatus relating to photography having means for containing film, means for drawing film from the means for containing film, rollers between which the film is delivered form the means for drawing film, journal bearings for the rollers in which one of the rollers is rotatable and in which the other roller is rotatable and slidable toward and away from the companion roller, means for holding the rollers in operative relation to each other, means for rotating one of the rollers when the rollers are in operative relation to each other for dislodging film therefrom, a receptacle to receive the dislodged film, and means for supporting and carrying the journal bearings.

28. In an apparatus relating to photography having means for containing film and having means for drawing film from the means containing film, a carrying member to which the film is delivered, means for cutting the film delivered to the carrying member, a receptacle to which the film is delivered by the carrying member, an immersing member operatively mounted with relation to the receptacle, arms from which the immersing member is suspended, and means for oscillating the arms actuated by the carrying member.

29. In an apparatus relating to photography having means for containing film, means for removing film therefrom, operatively connected rollers between which the film is delivered by the means for removing film from the container, means for rotatably mounting one of the rollers and for rotatably and slidably mounting the other roller whereby one of the rollers may be moved away from and toward the other roller, means for transporting the means for supporting the rollers for carrying the film therebetween and means operative for rotating one of the rollers while being transported for releasing the film.

30. In an apparatus relating to photography having means for containing film, means for drawing film from the film container, gripping rollers between which the film is delivered, means for rotatably supporting one of the rollers and for rotatably and slidably supporting the companion roller, means for transporting the means for supporting the rollers, means for arresting one of the rollers while the said rollers are being transported whereby said rollers are separated, and means for holding the arrested roller against the means for arresting it while the roller transporting means is moved to return the roller to operative relation with the arrested roller.

31. In an apparatus relating to photography having means for containing film, means for drawing film from the film container, gripping rollers between which the film is delivered, means for rotatably supporting one of the rollers and for rotatably and slidably supporting the companion roller, means for transporting the means for supporting the rollers, means for arresting one of the rollers while the said rollers are being transported whereby said rollers are separated, and means for holding the arrested roller against the means for arresting it while the roller transporting means is moved to return the roller to operative relation with the arrested roller, and means for rotating one of the rollers while being transported.

32. In an apparatus relating to photography having means for containing film, means for drawing film, a carrying apparatus for the film to which it is delivered, said carrying means including operatively connected rollers, means for rotatably supporting one of said rollers and for rotatably and slidably supporting the other of said rollers, whereby the said rollers may be free to move toward or away from each other, a sildable frame for carrying the roller supports, means for arresting one of the rollers and permitting the other roller to travel therefrom, means for holding the arrested roller in position while the companion roller is being moved toward it, and means operative during the transportation of the rollers for rotating one of said rollers for dislodging film therefrom.

33. In an apparatus relating to photography having means for containing film, means for drawing film from the film container, a carrying apparatus for the film to which it is delivered, said carrying means including operatively connected rollers, means for rotatably supporting one of said rollers and for rotatably and slidably supporting the other of said rollers, whereby the said rollers may be free to move toward and from each other, a slidable frame for carrying the roller supports, means for arresting one of the rollers and permitting the other roller to travel therefrom, means for holding the arrested roller in position while the companion roller is being moved toward it, means operative during the transportation of the rollers for rotating one of the rollers for dislodging film therefrom, and a receptacle for receiving the dislodged film.

34. In an apparatus relating to photography having means for containing film, means for drawing film from the film container, a carrying apparatus for the film to which it is delivered, said carrying means including operatively connected rollers, means for rotatably supporting one of said rollers and for rotatably and slidably supporting the other of said rollers, whereby the said rollers may be free to move toward and from each other, a slidable frame for carrying the roller supports, means for arresting one of the rollers and permitting the other roller to travel therefrom, means for holding the arrested roller in position while the companion roller is being moved toward it, means operative during the transportation of the rollers for rotating one of said rollers for dislodging film therefrom, an immersing frame, and means actuated by the transporting means for operating the immersing frame.

35. In an apparatus relating to photography having means for containing film, means for carrying the film from the film container, rollers between which the film is delivered, roller transporting means including means for rotatably supporting one of the rollers and rotatably and slidably supporting the coöperating roller, means operative during the actuation in one direction of the transporting means for separating said rollers, means operative during the movement of the transporting in an opposite direction, for holding said rollers in operative relation, and means operative in connection with the transporting means for rotating one of the rollers.

36. In an apparatus relating to photography having a casing including means for containing film, means for drawing film from the film container rollers, means for rotatably supporting one of the rollers, means for rotatably and slidably supporting the other of said rollers, roller transporting means for carrying the means on which the rollers are rotatably supported, means for separating the rollers during their transportation and in position to receive the exposed film therebetween from the means for receiving film from the first mentioned drawing means, means for holding one of the rollers stationary while the other roller is carried by the transporting means into operative relation with the held roller for clamping the film therebetween, the said transporting means carrying the film in the casing, a receptacle in the casing, and means for rotating one of the rollers while being transported for depositing film in the receptacle.

In testimony whereof, I affix my signature in the presence of two witnesses.

GEORGE C. BEIDLER.

Witnesses:
  A. T. HASTINGS,
  G. C. KINGDON.